US005133036A

United States Patent [19]

Törnqvist

[11] Patent Number: 5,133,036

[45] Date of Patent: Jul. 21, 1992

[54] THIN-FILM MATRIX STRUCTURE FOR AN ELECTROLUMINESCENT DISPLAY IN PARTICULAR

[75] Inventor: Runar Törnqvist, Helsinki, Finland

[73] Assignee: Planar International Oy, Espoo, Finland

[21] Appl. No.: 715,378

[22] Filed: Jun. 11, 1991

[30] Foreign Application Priority Data

Jun. 11, 1990 [FI] Finland ................................ 902908

[51] Int. Cl.[5] ............................................... G02B 6/10

[52] U.S. Cl. ................................... 385/130; 385/131; 385/147

[58] Field of Search ............... 350/96.13, 96.14, 96.15; 385/129, 130, 131, 132

[56] References Cited

U.S. PATENT DOCUMENTS

| | | | |
|---|---|---|---|
| 4,327,962 | 5/1982 | Redman | 350/96.15 |
| 4,693,549 | 9/1987 | Cheo | 350/96.14 |
| 4,943,133 | 7/1990 | Deri et al. | 350/96.14 |
| 4,946,243 | 8/1990 | Suzuki et al. | 350/96.14 X |
| 4,950,044 | 8/1990 | Makita | 350/96.14 |
| 5,035,479 | 7/1991 | Vounckx | 350/96.14 |

*Primary Examiner*—Akm E. Ullah

*Assistant Examiner*—Phan T. Hearthey

*Attorney, Agent, or Firm*—Jones, Day Reavis & Pogue

[57] ABSTRACT

The present invention relates to a thin-film matrix structure particularly suitable for electroluminescent displays, said structure comprising a substrate (7) capable of supporting the thin-film structure to be fabricated, a first electrode structure (9) formed onto the substrate (1), said structure being comprised of elongated parallel electrode conductors, a luminescent multilayered thin-film structure (10, 11, 12) formed onto the first electrode structure (9), and a second, transparaent electrode structure (13, 14) formed on said luminescent multilayered thin-film structure (10, 11, 12), said second electrode structure comprising elongated parallel electrode conductors which are aligned essentially orthogonally to the electrode conductors of the first electrode structure (9). According to the invention, the first electrode structure (9) is formed as a layer of metallic or metal alloy composition, and each transparent electrode conductor (13) of the second electrode structure (13, 14) is provided with a narrow stripe (14) of high electrical conductivity, whereby said stripe in itself need not be transparent. The structure in accordance with the invention provides reduced power consumption.

11 Claims, 4 Drawing Sheets

THIN-FILM MATRIX STRUCTURE FOR AN ELECTROLUMINESCENT DISPLAY IN PARTICULAR

BACKGROUND OF THE INVENTION

The present invention relates to an electroluminescent thin-film matrix structure in accordance with the preamble of claim 1 that facilitates low power consumption as well as the use of such emission filter materials that in general are incompatible with elevated process temperatures necessary during the production of the light-emitting thin-film structure of a display unit.

Electro-optic structures capable of emitting light are characterized by generation of visible emissions achieved by connecting an electric field over two electrodes, whereby light is produced in a phosphor material placed between said electrodes. If the light emission is viewed through one of the electrodes as is customary with electroluminescent and liquid-crystal displays, at least one of the electrodes must be transparent.

Conventionally, electroluminescent displays are of the matrix type, in which light is generated at the cross-points, or picture elements called pixels, of a transparent column electrode and a metallic row electrode of high conductivity. Emitted light is viewed through the glass substrate, because the transparent electrode pattern layer is deposited prior to the deposition of the light-emitting phosphor layer. A typical electroluminescent thin-film structure is diagrammatically shown in FIG. 1. A transparent conductive layer 2, typically of indium-tin oxide (ITO), is deposited onto a glass substrate 1. The layer is patterned appropriately as, e.g., straight parallel electrodes for a matrix display. Next, a thin-film dielectric layer, thin-film phosphor layer and thin-film dielectric layer are sequentially deposited to form a layered structure 3, 4, 5, which performs as the central component of the electroluminescent display. Finally, a metallic thin-film layer 6 is deposited patterned as the column electrodes in a matrix display. The thickness of the individual thin-film layers is generally of the order of 200 . . . 700 nm. In practice, the thin-film structure must be protected from ambient moisture. This is achieved by laminating a protective glass panel to the structure with epoxy, or alternatively, by using glass encapsulation filled with silicon oil or inert gas.

The thin-film structure shown in FIG. 1 is functional in electroluminescent matrix displays currently in production. The structure has, however, at least two profound problems.

In order to minimize power consumption of the display, the conductivity of the transparent column electrode should be maximally high. Practical constraints pose difficulties when attempts are made to achieve a sheet resistivity lower than 3 ohm/square. Typically, the sheet resistivity can even be in excess of 5 ohm/-square. Due to this fact, a major portion of power consumption in an electroluminescent matrix display relates to the power losses in the transparent column electrodes.

In principle, the situation could be improved through augmenting the transparent electrode, which is deposited on the substrate glass, by a narrow metallic stripe of high conductivity. Such a solution is, however, hampered by practical problems, because the metallic stripe must be sufficiently conductive, yet narrow enough not to disturb the readability of the display by its width or to interfere with the processing of the subsequently deposited layers by its thickness.

Another weakness of conventional electroluminescent thin-film structures is associated with the implementation of a multicolor display by means of light filters and an electroluminescent structure emitting white light. Here, in order to avoid the parallax effect, the light filters should be placed at a distance not greater than, e.g., 10 . . . 50 μm from the light-emitting phosphor layer. This would necessitate placing the light filters between the glass substrate and the transparent electrode. Consequently, the high process temperature necessary for the production of electroluminescent thin-film structures excludes the use of light filters based on organic materials.

SUMMARY OF THE INVENTION

It is an object of the present invention to overcome the above-described disadvantages by means of a novel electroluminescent thin-film structure.

The invention is based on using a substrate, which need not necessarily be transparent, onto which substrate is first deposited a thin-film electrode layer, which is at least partially metallic or of a metal alloy, and then patterning said layer into either column or row electrodes. By contrast, the electrodes to be processed onto the electroluminescent thin-film layer are fabricated starting from a transparent, conductive thin-film pattern whose conductivity is improved with the help of thin metallic stripes as illustrated in FIG. 2. Thus, the light emitted from the structure is viewed from the side of deposited thin-film layers, contrary to the conventional practice of viewing the light through the glass substrate.

In a particularly advantageous embodiment of the invention, the column electrodes are designed to be the metallic electrode layer facing the substrate.

More specifically, the electroluminescent thin-film structure according to the invention is characterized by what is stated in the characterizing part of claim 1.

The invention provides outstanding benefits. Particularly, the resistances of the column electrodes can be reduced to a level making the losses insignificant with respect to the prior-art techniques. This not only achieves a reduction of power losses to a category facilitating the use of electroluminescent matrix displays in portable computers, but also allows the use of higher excitation field frequency to increase the brightness of the display.

For the same reason, a significant improvement in the conductivity of the column electrodes aids the manufacture of multirow displays. Furthermore, the present invention facilitates the use of such light filter materials that do not tolerate temperatures above 200° C. For instance, the present invention makes it possible to use polyimide-based color filter films in conjunction with electroluminescent displays.

According to the invention, deposition of a high-conductivity, transparent thin-film electrode layer becomes unnecessary. Instead, it is sufficient to grow a transparent thin-film layer whose sheet resistivity can be as high as 1 kohm or even more.

The invention is next examined in detail with the help of the attached drawings and exemplifying embodiments illustrated therein.

DETAILED DESCRIPTION OF THE INVENTION

EXAMPLE 1

Figure 1:
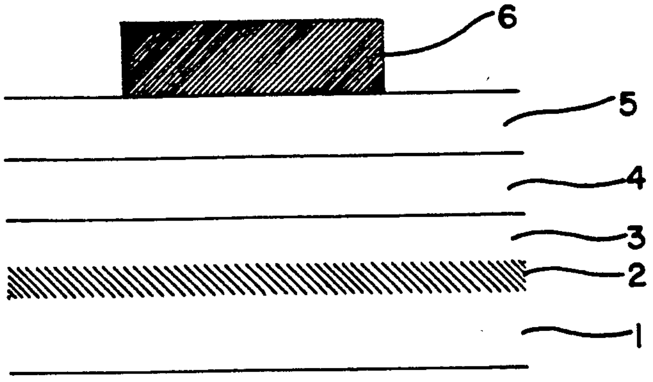
FIG. 1 is a cross-sectional side view of a thin-film matrix structure of the prior-art technology for use in an electroluminescent display.
Figure 2:
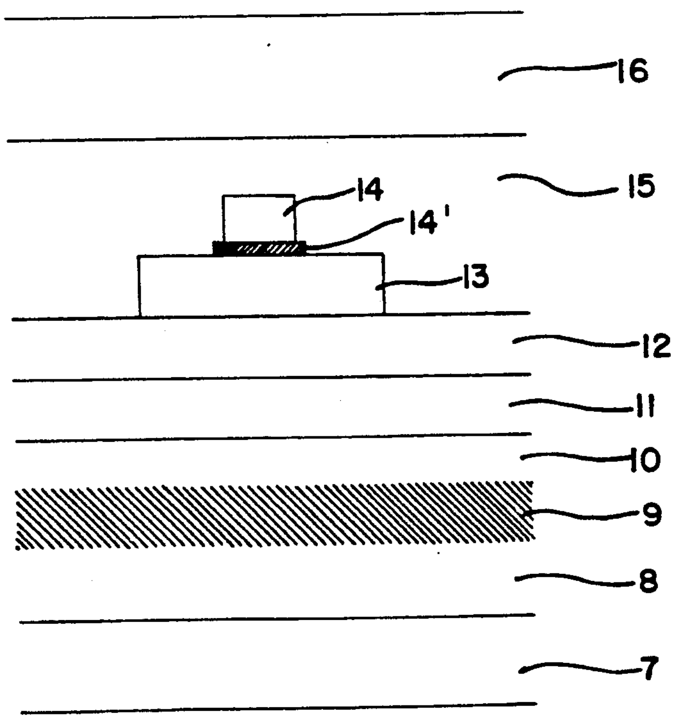
FIG. 2 is a cross-sectional side view of a thin-film matrix structure according to the invention that is particularly suitable for use in an electroluminescent display.

FIG. 2 shows a cross-sectional view of an electroluminescent thin-film structure according to the invention. The display matrix in the illustrated case has a size of 640*400 pixels. First, onto a soda glass substrate 7, there is deposited a conventional ion-diffusion barrier layer 8, such as an $Al_2O_3$ layer, which as such is redundant if a suitable glass substrate material, e.g., borosilicate glass or quartz is used. The next step consists of the sputtering of a molybdenum thin-film layer 9, which is characterized by its nonreactiveness with any of the layers to be deposited during the subsequent process stages. The molybdenum layer 9 has a thickness of approx. 50 . . . 500 nm, preferably approx. 200 nm, and it is processed to form the column electrode pattern shown in FIG. 3 using photolithography methods well known in the art in conjunction with a conventional aluminum etch of commercial grade (Merck PES-83.5-5.5-5.5, $H_3PO_4$—$CH_3COOH$—$HNO_3$).

Figure 3:
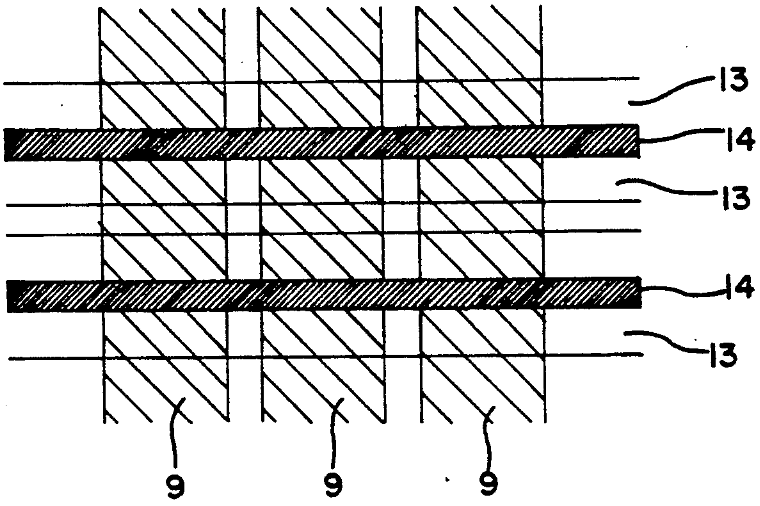
FIG. 3 is a top view of the thin-film matrix structure illustrated in FIG. 2.

Deposited during the next stage is a conventional luminescent multilayered thin-film structure 10, 11, 12 with dual dielectric layers that in the exemplifying case comprises an $Al_2O_3/TiO_2$ thin-film layer 10 of approx. 300 nm thickness fabricated with the help of the ALE process (U.S. Pat. No. 4,058,430) at 500° C., combined with a ZnS:Mn thin-film layer 11 of approx. 500 nm thickness and an $Al_2O_3/TiO_2$ thin-film layer 12 of approx. 300 nm thickness. Next, using sputtering methods, grown is a layer such as an ITO thin-film layer 13 having a thickness of approx. 10 . . . 300 nm, preferably approx. 80 nm. The lower limit for the thickness of the layer 13 is determined by minimum conductivity required of this layer. The layer is patterned into row electrodes shown in FIG. 3 using conventional photolithography. The layer is etched using a 50% HCl etch at 50 ° C. Next, using sputtering methods, grown is a chromium layer 14, to the thickness of approx. 10 . . . 50 nm, preferably approx. 20 nm, after which the layer is patterned into stripes running atop the ITO electrode pattern so that the stripe width is approx. 5 . . . 30%, preferably approx. 10% of the ITO electrode width, which in the present case means a stripe width of approx. 20 μm. Conventional methods of photolithography are used during processing, and etching is carried out using an ammonium-cerium nitrate solution. The etch time is approx. 30 s. Next there is sputtered a copper thin-film layer 14 of approx. 0.5 . . . 3 μm thickness, preferably 1 μm thick. The layers are patterned as shown in FIG. 3 so as to leave the chromium conductor 14' covered by copper maximally by the width of the chromium conductor. Conventional methods of photolithography are again used, combined with 25% $HNO_3$ etch.

The stripe conductor layer 14 can also be processed starting from an aluminum layer of approx. 0.5 . . . 3 μm thickness.

Finally, the structure is encapsulated under a protective backing glass 16 adhered by gluing with epoxy 15 of a commercially available grade such as Epotek 301-2.

When a larger-size display is desirable, the conductivity of the molybdenum electrode and the copper stripe must be increased. In practice this is achieved by the use of thicker layers.

EXAMPLE 2

The process parameters used in this example are related to a display with 2.5 lines/mm resolution, fabricated onto an opaque substrate that in the exemplifying case is a dia. 6" silicon wafer. Alternatively, the substrate could be, e.g., a metal plate or a metallized or otherwise opaquely coated transparent substrate, whereby the conductive material is first coated with a dielectric material to avoid short-circuiting the first layer of electrodes. As a further alternative, also a ceramic substrate is feasible.

Initially, using thermal oxidation known in the art (VLSI Technology, ed. S.M. Sze, p. 131 . . . 149), onto a silicon wafer 17, there is deposited a silicon dioxide layer 18 of 0.1 . . . 1 μm thickness, preferably approx. 500 nm thickness. Next, there is sputtered a titanium-tungsten thin-film layer 19 of approx. 100 . . . 1000 nm thickness, preferably approx. 300 nm. The layer is patterned into the column electrodes of the display unit using conventional photolithography (refer to Example 1). The layer is etched using a 15% solution of $H_2O_2$ at 50° C., whereby the etch time is approx. 5 min.

Figure 4:
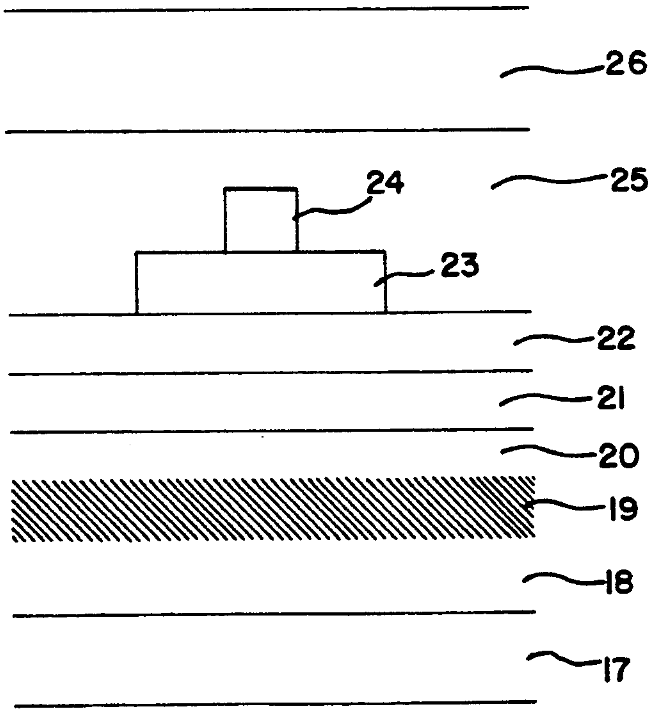
FIG. 4 is a cross-sectional side view of a second thin-film matrix structure according to the invention that is particularly suitable for use in an electroluminescent display.
Figure 5:
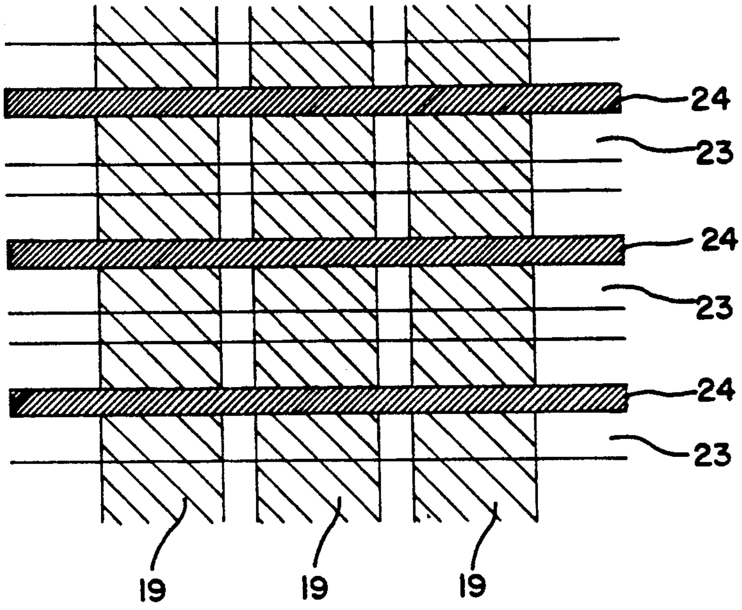
FIG. 5 is a top view of the thin-film matrix structure illustrated in FIG. 4.

During the next stage grown is a conventional luminescent multilayered thin-film structure 20, 21, 22 with dual dielectric layers that in the exemplifying case comprises a first $SiO_xN_y$ thin-film layer 20 of approx. 250 nm thickness grown by sputtering without preheating of the substrate. The second layer 21 is a ZnS:Mn thin-film layer 21 of approx. 0.5 μm thickness grown by evaporation onto the substrate maintained at approx. 210° C. The third layer 22 is produced in the same manner as the first layer 20, after which the structure is annealed at 450° C. for approx. 1 h. Next, using sputtering methods, there is deposited a zinc oxide thin-film layer 23 (ZnO:Al) of approx. 50 . . . 600 nm thickness, preferably approx. 200 nm thickness. The zinc oxide layer is patterned into row electrodes of the display unit using conventional photolithography. The layer is etched using an HCl etch at room temperature. Next, using sputtering methods, grown is an aluminum layer 24 to the thickness of approx. 1 . . . 3 μm, preferably approx. 2 μm. Then, the layer is patterned into stripes shown in FIG. 4 that run atop the transparent electrode conductors. The stripes have a width of approx. 5 . . . 30%, preferably approx. 10% of the zinc oxide electrode width, which in the present case means a stripe width of approx. 25 μm. Conventional methods of photolithography are used during patterning, and etching is carried out using a conventional etch for aluminum, that is, a mixture of $HPO_3$, $HNO_3$ and acetic acid. Finally, the structure is encapsulated under a backing glass 26 bonded with epoxy 25 as described in Example 1.

EXAMPLE 3

This example deals with the display structure type depicted in Example 1.

Figure 6:
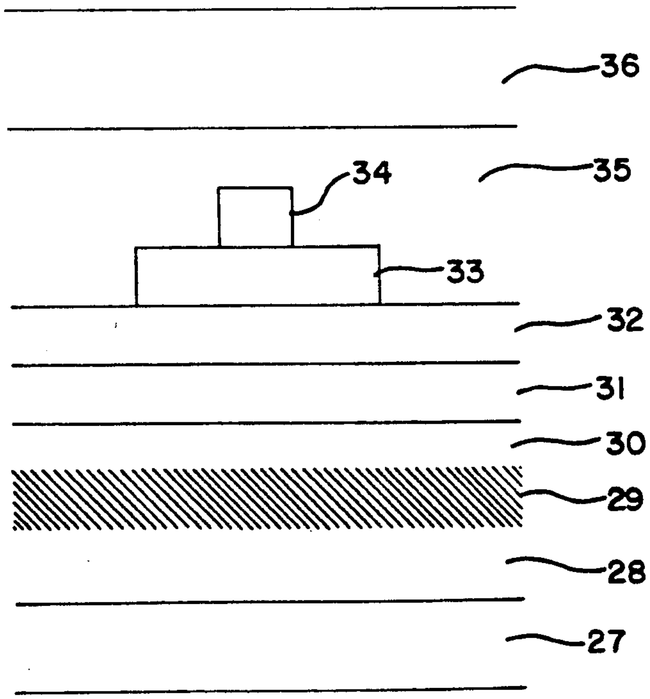
FIG. 6 is a cross-sectional side view of a third thin-film matrix structure according to the invention that is particularly suitable for use in an electroluminescent display.
Figure 7:
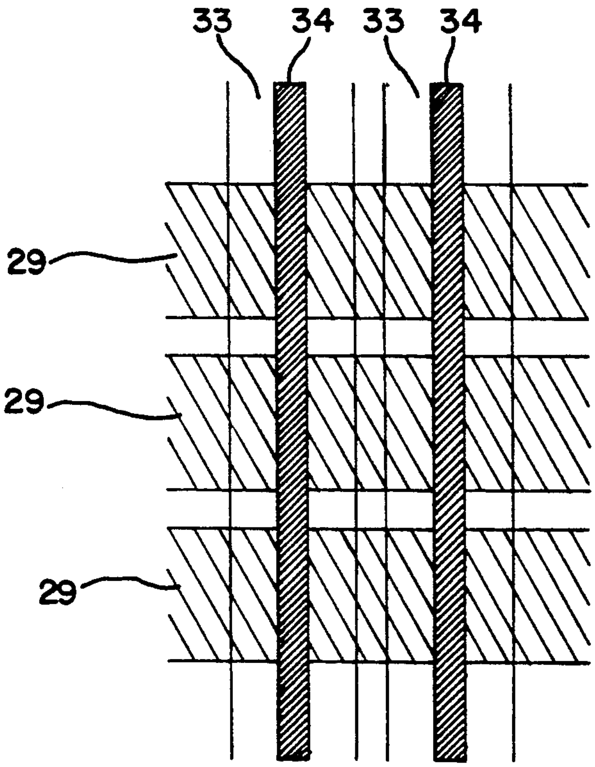
FIG. 7 is a top view of the thin-film matrix structure illustrated in FIG. 6.

Initially, onto a soda glass substrate 27, there is deposited an ion-diffusion barrier film 28, which in the exemplifying case is a 300 nm thick aluminum oxide layer 28. Next, sputtered is a tungsten thin-film layer 29 which for the exemplifying case of a half-page display unit has a thickness of approx. 400 . . . 1000 nm thickness, preferably approx. 600 nm. The layer is patterned into the row electrodes of the display unit shown in FIG. 7 using conventional photolithography, and etched using an $H_2O_2$etch at approx. 40° C., whereby the etch time is approx. 15 min. Then, there is grown a conventional luminescent multilayered thin-film structure 30, 31, 32 with dual dielectric layers as described in Example 1. During the next stage, there is grown by sputtering an ITO thin-film layer 33 (refer to Example 1) with a thickness of approx. 20 . . . 200 nm, preferably approx. 50 nm, after which the layer is processed to attain the column electrode pattern illustrated in FIG. 6 using conventional photolithography and the etch described in Example 1. Next, using sputtering methods, there is deposited an aluminum thin-film layer 33 (refer to Example 2) to the thickness of approx. 200 . . . 800 nm, preferably approx. 500 nm, and the layer is patterned to a stripe width approx. 5 . . . 30%, preferably 10%, of the ITO row electrode width, which in the present case means a stripe width of approx. 25 μm. Finally, the structure is encapsulated under a backing glass 26 and the air space is filled with silicon oil 35, after the structure is baked in vacuum (less than 1 mbar pressure) for approx. 1 h at 120° C.

According to the invention, the first electrode structure, which is the lower electrode structure 9, can be fabricated from a metal of suitably low reactivity such as molybdenum (Mo), tungsten (W), tantalum (Ta), nickel (Ni), cobalt (Co) or similar metals or an alloy thereof. Alternatively, the material of the lower electrode structure can be a metal of high electrical conductivity protected, when necessary, by another metal such as chromium or molybdenum for example. In this case the lower electrode structure is mainly of gold (Au), silver (Ag), aluminum (Al) or copper (Cu) or an alloy thereof. An essential requirement is the use of a metallic electrode material of sufficient stability.

The second, transparent upper electrode structure 13 can alternatively be fabricated starting from a very thin metal film having a thickness of, e.g., less than 50 nm, said film being, for instance, of aluminum (Al), silver (Ag), chromium (Cr), nickel (Ni), gold (Au) or a similar metal.

Alternatively, the second, transparent electrode structure 13 can be fabricated of a chemical compound such as indium-tin oxide (ITO), tin oxide ($SnO_2$), zinc oxide (ZnO) or a similar compound that can further be doped appropriately, if necessary.

What is claimed is:

1. A thin-film matrix structure for an electroluminescent display in particular, said structure comprising:

a substrate (7) capable of supporting the thin-film structure to be fabricated;

a first electrode structure (9) formed onto the substrate (7), said structure being comprised of elongated parallel electrode conductors;

a luminescent multilayered thin-film structure (10, 11, 12) formed onto the first electrode structure (9);

a second, transparent electrode structure (13, 14) formed on said luminescent multilayered thin-film structure (10, 11, 12), said second electrode structure comprising elongated parallel electrode conductors which are aligned essentially orthogonally to the electrode conductors of the first electrode structure (9)

characterized in that:

the first electrode structure (9) has an at least partially metallic or metal alloy composition so as to minimize the resistance of the parallel conductors; and a metallic stripe (14) of high electrical conductivity is associated with and being substantially narrower than each second transparent electrode conductor (13) to improve the conductivity of each transparent electrode such that the stripe in itself need not be transparent and light emitted from the structure may be viewed from the transparent electrode side of the structure.

2. A thin-film matrix structure according to claim 1, characterized in that said stripe (14) is at least partially fabricated of cooper (Cu), aluminum (Al), silver (Ag) or gold (Au).

3. A thin-film matrix structure according to claim 2, characterized in that said stripe (14) is formed as a chromium bonding layer of approximately 20 nm thickness, on which bonding layer a cooper or aluminum layer of approximately 1 μm thickness is deposited.

4. A thin-film matrix structure according to claim 1, characterized in that said first electrode structure (9) is mainly formed of a metal such as molybdenum (Mo), tungsten (W), tantalum (Ta), nickel (Ni), titanium (Ti), cobalt (Co) or a similar metal or an alloy thereof that has substantially no reactiveness with any of the layers formed thereafter.

5. A thin-film matrix structure according to claim 1, characterized in that said first electrode structure (9) is mainly formed of a metal of a high electrical conductivity such as gold (Au), silver (Ag), aluminum (Al) or copper (Cu) or an alloy thereof.

6. A thin-film matrix structure according to claim 5, characterized in that said first electrode structure (9) includes a passivation and protective layer (16) atop the metallic first electrode structure with the high electrical conductivity.

7. A thin-film matrix structure according to claim 1, characterized in that said second electrode structure (13) is formed from a metallic film of thickness less than 50 nm,

8. A thin-film matrix structure according to claim 7, characterized in that said second electrode structure (13 . . . 16) is formed from the group consisting of aluminum (Al) chromium (Cr), gold (Au), nickel (Ni) or a similar metal or an alloy thereof.

9. A thin-film matrix structure according to claim 1, characterized in that said second electrode structure (13) is formed of the group consisting of indium-tin oxide (ITO), tin oxide ($SnO_2$) or zinc oxide (ZnO).

10. A matrix thin-film structure according to claim 1, characterized in that at least one of the thin-film structures is fabricated using the ALE technique.

11. A matrix thin-film structure according to claim 1, characterized in that said first electrode structure (9) is designed to perform as the column electrode structure, while said second electrode structure (13), correspondingly, performs as the row electrode structure.

* * * * *